US012678899B2

(12) United States Patent
Ng

(10) Patent No.: US 12,678,899 B2
(45) Date of Patent: Jul. 14, 2026

(54) SYSTEM AND METHOD FOR CONTOURING EDGES OF AIRFOILS

(71) Applicant: General Electric Company, Evendale, OH (US)

(72) Inventor: Henry Ng, Cincinnati, OH (US)

(73) Assignee: General Electric Company, Evendale, OH (US)

( * ) Notice: Subject to any disclaimer, the term of this patent is extended or adjusted under 35 U.S.C. 154(b) by 0 days.

(21) Appl. No.: 18/935,944

(22) Filed: Nov. 4, 2024

(65) Prior Publication Data

US 2025/0058415 A1     Feb. 20, 2025

Related U.S. Application Data

(62) Division of application No. 18/150,588, filed on Jan. 5, 2023, now Pat. No. 12,162,109.

(Continued)

(51) Int. Cl.
*B24B 19/14*        (2006.01)
*B23P 6/00*         (2006.01)
(Continued)

(52) U.S. Cl.
CPC .............. *B23P 6/002* (2013.01); *F01D 5/141* (2013.01); *F01D 9/02* (2013.01);
(Continued)

(58) Field of Classification Search
CPC . B23P 6/002; F01D 5/141; F01D 9/02; F01D 5/005; F01D 5/20; F01D 25/285;
(Continued)

(56) References Cited

U.S. PATENT DOCUMENTS 5,644,394  A     7/1997  Owens
5,958,166  A     9/1999  Walters
(Continued)

FOREIGN PATENT DOCUMENTS

CN        103089325        5/2013
CN        106413989        2/2017
(Continued)

OTHER PUBLICATIONS

English translation of JP-4889858-B2 (Year: 2012).*
(Continued)

*Primary Examiner* — Jun S Yoo
(74) *Attorney, Agent, or Firm* — Fitch, Even, Tabin & Flannery LLP

(57)            ABSTRACT

A tool for contouring an airfoil comprises a main body that includes a locator portion and an upper portion. The locator portion includes an engagement surface and the engagement surface is sized and configured to engage an airfoil. The upper portion includes an edge slot sized and configured for placement of an edge of the airfoil into the slot. An abrasive material is applied to the sides of the edge slot. The upper portion and the locator portion are together sized and shaped so that when the edge of the airfoil is disposed in the edge slot and the engagement surface of the locator portion is simultaneously pressed against the airfoil, engagement of the abrasive material with the edge of the airfoil is effective to contour the edge of the airfoil to a preselected and desired shape.

16 Claims, 16 Drawing Sheets

Related U.S. Application Data

(60) Provisional application No. 63/346,415, filed on May 27, 2022.

(51) Int. Cl.

*F01D 5/14*    (2006.01)

*F01D 9/02*    (2006.01)

(52) U.S. Cl.

CPC .... *F05D 2220/323* (2013.01); *F05D 2230/10* (2013.01); *F05D 2240/121* (2013.01); *F05D 2240/303* (2013.01)

(58) Field of Classification Search

CPC .......... F05D 2220/323; F05D 2230/10; F05D 2240/121; F05D 2240/303; F05D 2220/36; F05D 2230/14; F05D 2230/80; F05D 2240/306; F05D 2230/72; F05D 2240/122; F05D 2240/125; F05D 2240/304; B64F 5/10; B64F 5/40; B64C 11/16; B24D 15/06; B24D 15/02; B24B 19/14

See application file for complete search history.

(56) References Cited

U.S. PATENT DOCUMENTS

| | | | | |
|---|---|---|---|---|
| 6,106,204 | A | * | 8/2000 | Dansereau ............... B23D 1/30 |
| | | | | 409/184 |
| 8,683,641 | B2 | | 4/2014 | Weinberger |
| 8,801,502 | B2 | | 8/2014 | Ng |
| 9,334,066 | B2 | | 5/2016 | Tapia |
| 9,643,313 | B2 | | 5/2017 | Hafenrichter |
| 11,014,202 | B1 | | 5/2021 | Petersen |
| 11,079,760 | B2 | | 8/2021 | Hafenrichter |
| 2004/0172826 | A1 | | 9/2004 | Memmen |
| 2013/0225055 | A1 | * | 8/2013 | Ng .......................... B24B 19/14 |
| | | | | 451/548 |
| 2015/0013126 | A1 | | 1/2015 | Czerner |
| 2016/0069184 | A1 | | 3/2016 | Ribic |
| 2023/0381901 | A1 | | 11/2023 | Ng |

FOREIGN PATENT DOCUMENTS

| | | | | |
|---|---|---|---|---|
| CN | 106737011 | | 5/2017 | |
| CN | 207308267 | U | 5/2018 | |
| CN | 108778613 | | 11/2018 | |
| CN | 211029420 | | 7/2020 | |
| EP | 2789422 | | 10/2014 | |
| EP | 2960015 | A1 | 12/2015 | |
| EP | 3191256 | | 7/2017 | |
| JP | 4889858 | B2 * | 3/2012 | ............. B23K 26/60 |
| WO | 2021069039 | A1 | 4/2021 | |

OTHER PUBLICATIONS

U.S. Appl. No. 18/150,588; Non-Final Rejection mailed Mar. 5, 2024; (pp. 1-11).

U.S. Appl. No. 18/150,588; Notice of Allowance and Fees Due (PTOL-85) mailed Aug. 23, 2024; (pp. 1-7).

* cited by examiner

814

816

801

810

808

806

804

CONVEX
(812)

CONCAVE
(813)

SYSTEM AND METHOD FOR CONTOURING EDGES OF AIRFOILS

CROSS-REFERENCE TO RELATED APPLICATION(S)

This application is a divisional of U.S. application Ser. No. 18/150,588 filed Jan. 5, 2023, which claims the benefit of U.S. Provisional Application No. 63/346,415 filed May 27, 2022, all of which are incorporated herein by reference in their entireties.

TECHNICAL FIELD

These teachings relate generally to contouring portions of airfoils (e.g., fan blades and/or propellers) of aircraft engines.

BACKGROUND

Aircraft engines have different blades or airfoils that direct air through different parts of aircraft engines or perform other functions. The edges of airfoils or blades can become mis-shaped or otherwise degraded because of wear, dirt, or other conditions. If the edge of the airfoil or blade becomes worn and degraded, it can lose its ideal or designed shape and the overall performance of the engine can suffer.

BRIEF DESCRIPTION OF DRAWINGS

Various needs are at least partially met through provision of the method and apparatus for contouring airfoils or fan blades or propellers of aircraft engines in the following detailed description, particularly when studied in conjunction with the drawings. A full and enabling disclosure of the aspects of the present description, including the best mode thereof, directed to one of ordinary skill in the art, is set forth in the specification, which refers to the appended figures, in which.

Figure 1:
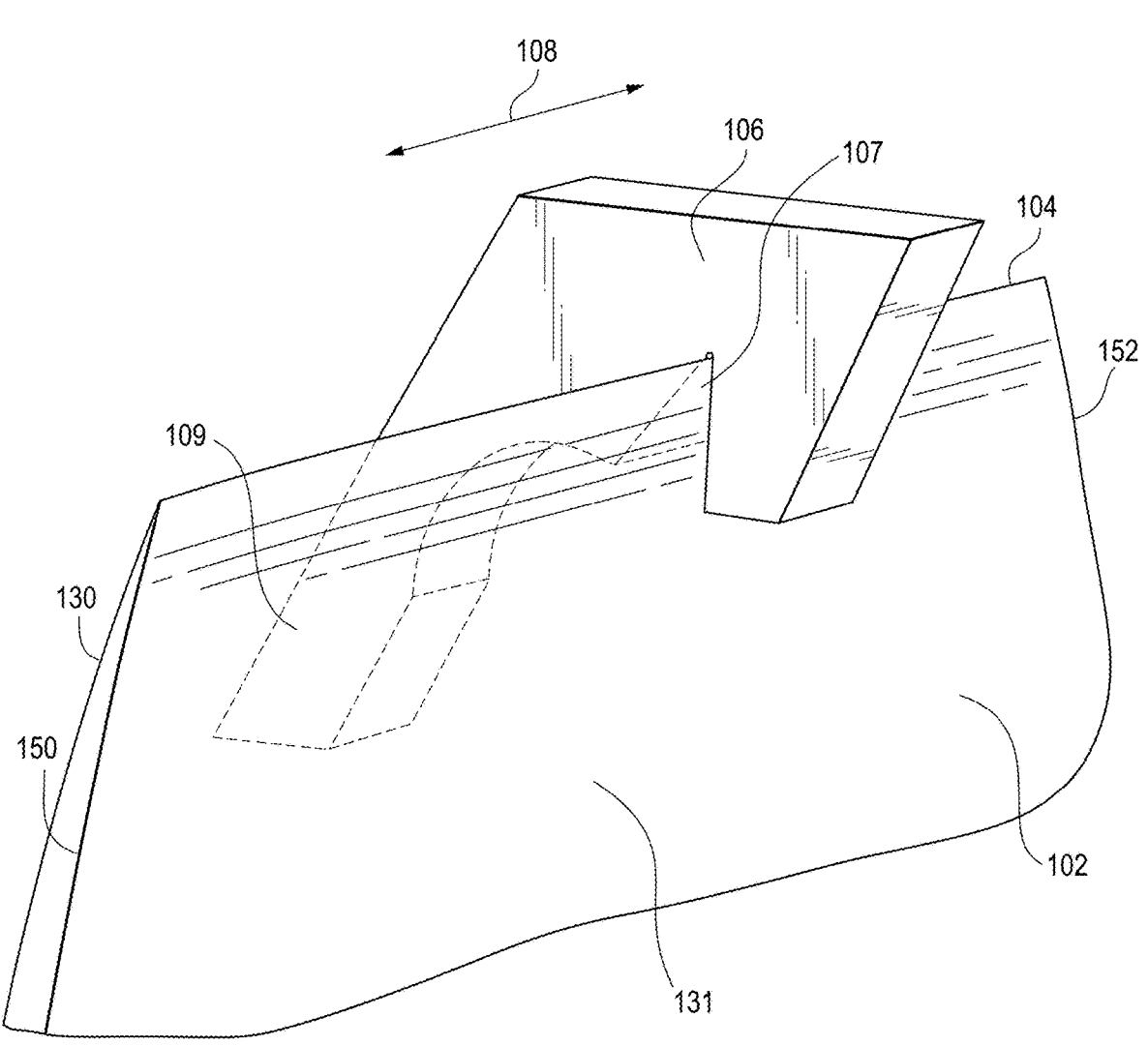
FIG. 1 comprises a diagram of a tool and airfoil as configured in accordance with various embodiments of these teachings.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present teachings. Also, common but well-understood elements that are useful or necessary in a commercially feasible embodiment are often not depicted in order to facilitate a less obstructed view of these various embodiments of the present teachings. Certain actions and/or steps may be described or depicted in a particular order of occurrence while those skilled in the art will understand that such specificity with respect to sequence is not actually required.

DETAILED DESCRIPTION

The approaches provided herein provide tools and approaches to contour the leading edges (and other edges) of airfoils, fan blades, and propellers of aircraft engines to improve the aerodynamic efficiency of the engine. The contouring can be performed, for example, while the engine is being installed in the aircraft or while the engine is on the aircraft. The tools are configured and customized specifically for a specific airfoil design or shape. That is, airfoils having different shapes will have different tools. By "leading edge," it is meant the region of the airfoil extending from the root to the tip of the airfoil, over which the relative airflow first passes (before passing over the remainder of the blade chord, the blade chord being a line from the leading edge of the airfoil to the trailing edge of the airfoil). In an axial flow gas turbine engine mounted on a conventional fixed wing aircraft, the leading edge is typically disposed forward of the chord of the blade, where the forward direction is the direction towards which the aircraft travels. The leading-edge region extends downstream a short distance either side of the relative airflow stagnation point.

It will be appreciated that much of the description provided herein relates to airfoils (used in aircraft engines). It will further be appreciated that the tools described herein can also operate on all types of fan blades and propellers. For example, these approaches are also applicable to fan blades and propellers of other systems.

The tools provided herein use the nominal shape of the airfoil and a locating feature to restore the leading-edge shape using an abrasive material such as sandpaper. The locating feature ensures that the shape of the airfoil is controlled to the nominal line of the airfoil during the contouring operation. In aspects, the tool is translated (moved) along the leading edge of the airfoil while pressure is applied (e.g., by a person or automated system) to the locating feature. As mentioned, the approaches provided herein are effective at contouring leading edges of airfoils and can be applied to all other edges of airfoils including trailing edges.

Multiple tools can be used to contour a single airfoil type or design. In aspects, each separate tool is configured to re-contour a different region of the airfoil. In one specific example, three tools are utilized with each of the three tools being designed to machine or contour a different aspect or portion of the airfoil. In examples, the first tool will remove the majority of erosion from the leading edge of the airfoil. If necessary, the second and/or the third tools will remove high points from the concave and convex sides of the airfoil. The resultant shape of the airfoil will conform to an ideal shape, near-ideal shape (as possible), or some other desired or specified shape.

It will be appreciated that only some portions of the leading edge of the airfoil may be contoured. If one end of the airfoil is viewed as being at the 0 percent position (e.g., the "root" or base of the airfoil as it connects to a shaft) and the other end of the airfoil is viewed as being at the 100 percent position (the opposite end or the tip portion), the contouring of the edge of the airfoil may occur only from the 75 percent to 100 percent position in one example. In this particular example, the tool is specifically designed for use with each airfoil to contour the outer 25 percent span (i.e., from the 75 percent position to the 100 percent position) of the airfoil. This region of the airfoil is where the majority of the thrust is generated.

In other aspects, a measure of the chord or the airfoil may be added to the airfoil to avoid removing too much material from the blade. This could also be achieved by marking the airfoil using a template to provide references for the process. Another use for a template would be to mark the limits of motion along the blade edge to prevent use of the tool in an area where the tool form is not appropriate, In other aspects, the tools provided herein utilize the nominal shape of the airfoil, at the thickest locations of the airfoil (approximately greater than the 75 percent position, i.e., the outer 25 percent), and a locating feature on the convex or concave side to restore the leading-edge shape using sandpaper or some other abrasive material. By using the certified nominal shape and accounting for the thickness of the abrasive material (e.g., sandpaper), the tool will restore the leading-edge shape to an approved certified design. The locating feature of the tool, when placed on the convex or concave side of the airfoil, will ensure the shape of the leading edge is controlled during contouring operations, to the nominal line or shape of the airfoil, and this ensures the leading-edge shape will not be skewed towards either side of the blade.

As the tool is translated (moved) along the leading edge, pressure is applied to the locating feature. This ensures the shape of the tool is properly applied to the leading edge as the airfoil varies in twist along the span of the airfoil. To ensure the movement is smooth and continuous along the leading edge, the tool thickness is selected to account for the varying twist of the airfoil, in addition to the pressure that is applied to the locating feature.

As mentioned, contouring is accomplished by translating (moving) the tool along the leading edge of the airfoil while applying pressure to the tool into the leading edge and onto the locating feature. In aspects, between 80-90 percent of the total force being applied to the tool (e.g., by a human hand or fingers) is applied onto the area of the tool engaging the leading edge of the airfoil while 10-20 percent of the total force applied to the portion of the tool is applied to the locating feature.

The ease of use and size of the tool is such that contouring can be performed while the engine is still attached to the aircraft. The dimensions of the tools are small enough that the tools fit between adjacent blades or airfoils of the engine as installed in an engine, with the engine being either on-wing or off-wing. In this instance, "on-wing" means the engine is installed on an aircraft, while "off-wing" means the engine is not installed on an aircraft. The contouring operations described herein create a more efficient fan blade, leading to fuel savings for the customer.

After the contouring is complete, a final coating step or operation may be performed. For example, the edge of the airfoil may be painted, or some other anti-corrosion coating or anti-abrasion coating may be applied.

Before the tool is used, preparatory steps may be taken. For example, the edge or surface may be cleaned to remove any existing coatings. These preparatory or precautionary steps may prevent clogging of the abrasive material (e.g., sandpaper) with paint, which may change the effectiveness of the abrasive material (e.g., sandpaper).

Many of the approaches described herein are described as being performed manually, e.g., with a human using the tool(s). However, it will be appreciated that these approaches can also be performed automatically or both automatically and manually. For example, the tools provided herein can be coupled to robotic arms (or an automated system) and the robots may control movement of the tool.

Other functions can also be performed by the tool besides contouring. For example, the tool may provide honing or lapping as metal surface finishing options.

In other advantages, the use of the tools described herein will allow for the restoration of the leading-edge shape without the need for a highly skilled operator or the use of an advanced manufacturing process. Additionally, the present approaches provide for improved repeatability in performing contouring operations. The present approaches also provide a specific procedural process and not a highly skilled process. The approaches provided herein have a lower potential for error and provide for reduced time to contour airfoils.

The terms and expressions used herein have the ordinary technical meaning as is accorded to such terms and expressions by persons skilled in the technical field as set forth above except where different specific meanings have otherwise been set forth herein. The word "or" when used herein shall be interpreted as having a disjunctive construction rather than a conjunctive construction unless otherwise specifically indicated. The terms "coupled," "fixed," "attached to," and the like refer to both direct coupling, fixing, or attaching, as well as indirect coupling, fixing, or attaching through one or more intermediate components or features, unless otherwise specified herein.

The singular forms "a", "an", and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin.

The foregoing and other benefits may become clearer upon making a thorough review and study of the following detailed description.

Referring now to FIG. 1, one example of an approach (including a tool) for contouring edges of airfoil blades is described. An airfoil 102 (which may be in an engine or removed from the engine) has a leading edge 104. A contouring tool 106 can be moved back-and-forth along the leading edge 104 of the airfoil 102 in directions indicated by the arrows labelled 108. The airfoil 102 may be any blade, vane, fan blade, or similar structure included in sections of an aircraft engine such as the compressor section of the aircraft engine or the turbine section of the aircraft engine. The contouring tool 106 includes a slot 107.

When the airfoil 102 is placed in the slot 107 of the contouring tool 106, the contouring tool 106 is pressed or positioned against the airfoil 102 using a locator portion 109 that is applied to the airfoil 102, and the contouring tool 106 is translated along the leading edge 104 of the airfoil 102, the leading edge 104 will be contoured according to a desired shape defined by the shape of the slot 107 of the tool 106. In these regards, the contouring tool 106 is dimensioned, shaped, and/or configured so that as the contouring tool 106 is translated along the leading edge 104 in the directions indicated by the arrows labeled 108, the contouring tool 106 grinds, smooths, sands, or otherwise impacts the leading edge 104 to conform the leading edge 104 to the shape of the slot 107 as oriented by the locator portion 109. More details concerning the contouring tool 106 and its use are described elsewhere herein.

Multiple tools can be used to contour different aspects of the leading edge 104 of the airfoil 102 (or areas associated with the leading edge). Each different tool may be designed to perform different operations on the leading edge 104 and/or different areas, sides, and regions of the airfoil 102.

Figure 2:
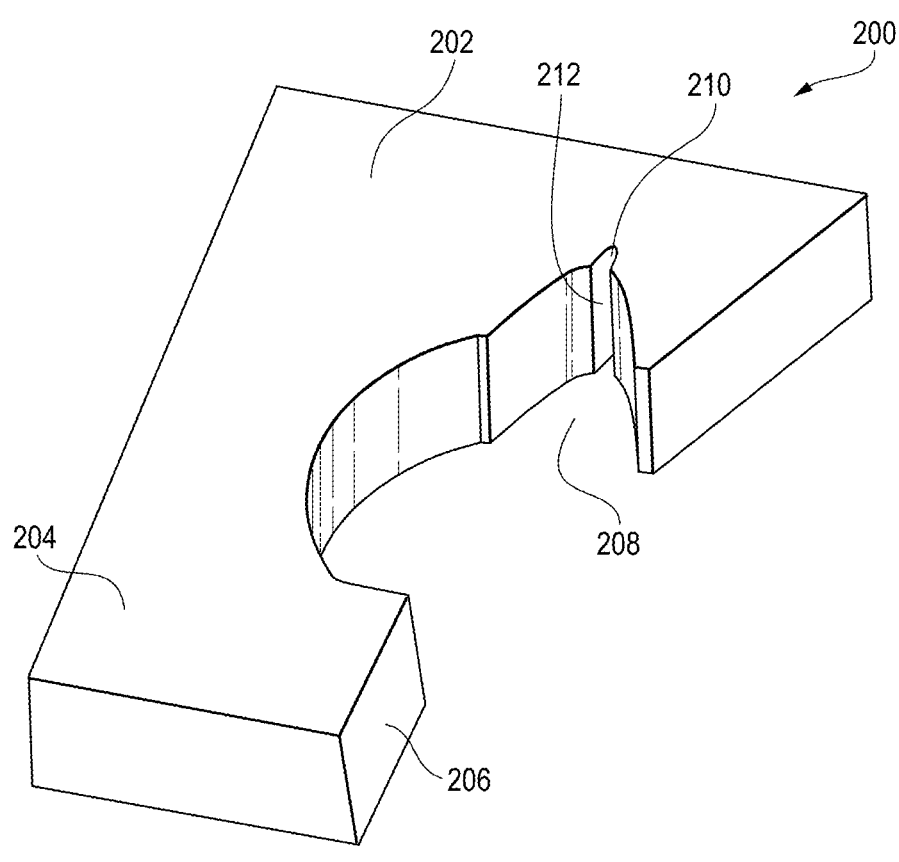
FIG. 2 comprises a diagram of a tool as configured in accordance with various embodiments of these teachings.
Figure 3:
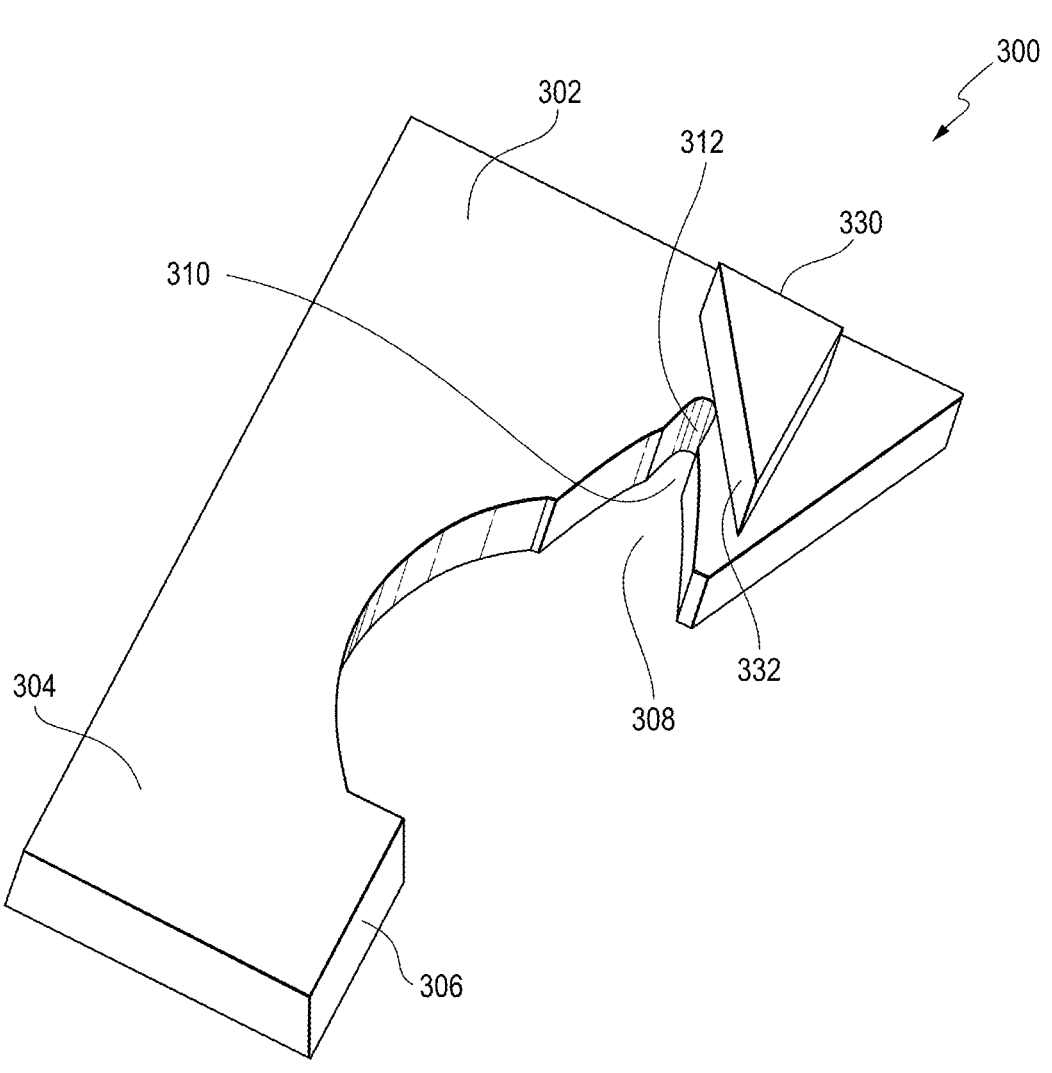
FIG. 3 comprises a diagram of a tool as configured in accordance with various embodiments of these teachings.
Figure 4:
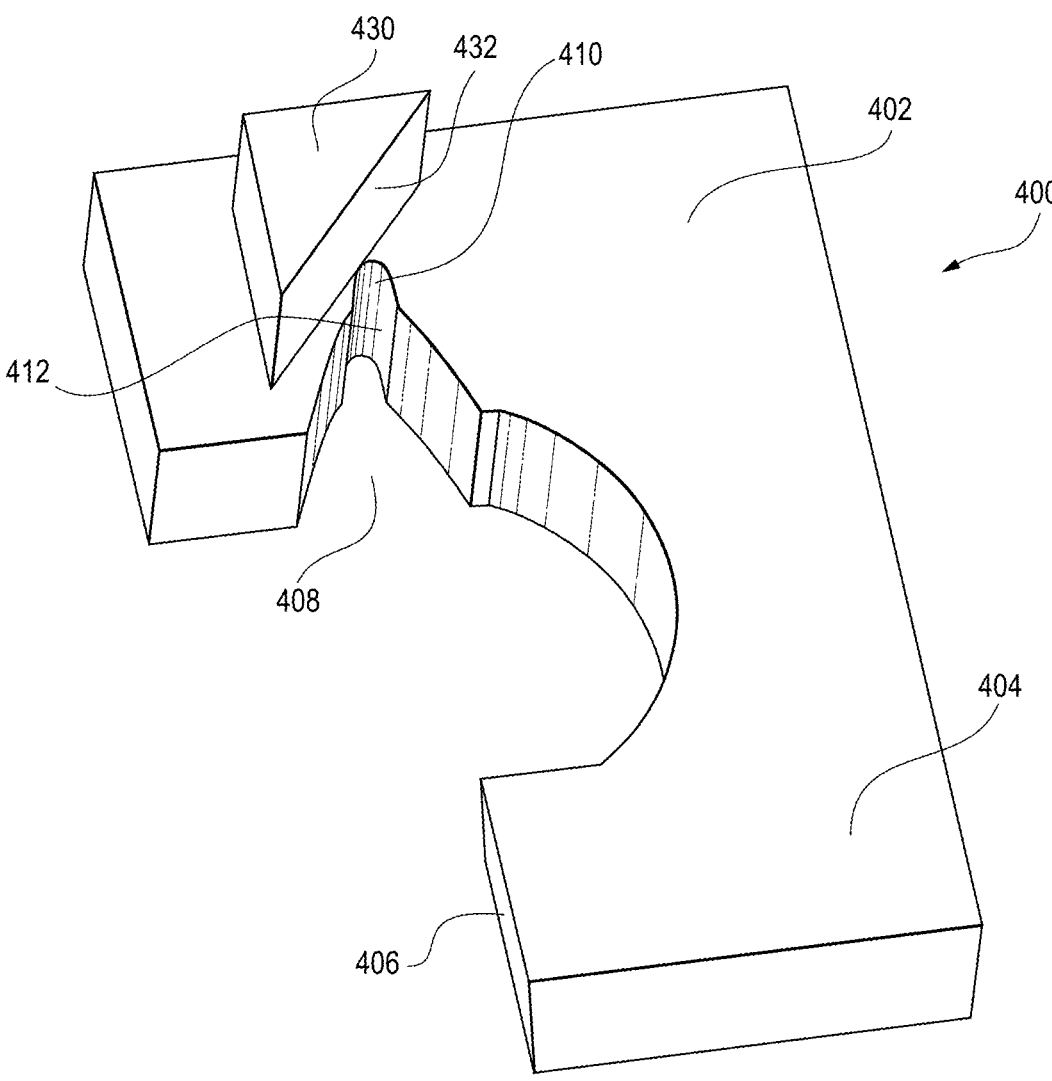
FIG. 4 comprises a diagram of a tool as configured in accordance with various embodiments of these teachings.

For example, and now referring to FIG. 2, FIG. 3, and FIG. 4, three such tools 200, 300, 400 are described. The tool 200 of FIG. 2 is configured to contour the airfoil 102 into a pre-defined ideal shape, near ideal shape, or desired shape. The tool 300 of FIG. 3 is configured to contour high spots or points (where the edge of the airfoil bulges or has some heightened area or edge) of the airfoil edge 104 on one side of the airfoil 102 (e.g., either the concave side or the convex side). The tool 400 of FIG. 4 is configured to contour high spots or points of the airfoil edge 104 on the opposite side of the airfoil 102 (e.g., opposite side of the side of FIG. 3 such as either the opposing concave side or the opposing convex side).

As mentioned and in some aspects, one end of the airfoil 102 is viewed as being at the 0 percent position and the other end of the airfoil 102 is viewed as being at the 100 percent position. The tools 106, 200, 300, 400 described herein utilizes the nominal shape of the airfoil 102, at the thickest locations of the airfoil 102 (approximately greater than the 75 percent position, which can also be considered the outer 25 percent), and a locating feature on the convex or concave side to restore the shape or contour of the leading-edge 104 using sandpaper or some other abrasive material. As the tools 106, 200, 300, 400 include the desired nominal shape and account for the thickness of the abrasive material (e.g., sandpaper), the tools 106, 200, 300, 400 will restore the shape or contour of the leading-edge 104 to a desired shape (e.g., an approved certified design).

In addition, the size, shape, and dimensions of the tools 106, 200, 300, 400 are configured and customized specifically for a specific design or shape of the airfoil 102. In other words, airfoils having different shapes will have different or separate tools. For example, depending upon the thickness, length, width, and twist of a particular airfoil design, the tool may be shaped or dimensioned differently.

Referring now specifically to FIG. 2, a tool 200 includes a main body 202 and a locator portion 204. The locator portion 204 has a surface 206. The upper portion of the main body 202 includes an open slot 208 including an edge slot 210 (for placement of the edge of the airfoil). The edge slot 210 is shaped and/or dimensioned according to the ideal or desired shape of the edge 104 of the airfoil 102 that the contouring operation is to perform. Sides 212 of the edge slot 210 have an abrasive material (e.g., sandpaper) applied. In aspects, the entire edge slot 210 has sandpaper applied. The sides of the open slot 208 may also include the abrasive material. The open slot 208 and the edge slot 210 are sized, shaped, and/or dimensioned according to a desired shape.

When the tool 200 is positioned on the airfoil 102, the edge 104 is positioned in the open slot 208 and edge slot 210, the surface 206 of the locator portion 204 is in contact with a surface 130 of the airfoil 102, and the tool 200 is translated along the leading edge 104 of the airfoil 102, the leading edge 104 will be contoured according to the desired shape. As the tool 200 is translated, the surface 206 of the locator portion 204 is translated along the surface 130 of the airfoil 102 (with the rest of the tool 200). As the surface 206 of the locator portion 204 is translated along the surface 130 of the airfoil 102, the surface 206 of the locator portion 204 moves with the contour (e.g., twist) of the surface 130 of the airfoil 102, ensuring that the leading edge 104 of the airfoil is properly contoured with respect to the contour of the surface 130 of the airfoil 102. The positioning of the surface 206 of the locator portion 204 on the surface 130 of the airfoil 102 maintains alignment of the airfoil 102 in the edge slot 210.

Various types of abrasive materials could be used in the tools 106, 200, 300, 400 described herein. Sandpaper is one example of an abrasive material, but other abrasive materials could include natural abrasive such as calcite, diamond, iron oxide, sand, feldspar or emery and synthetic abrasives such as CBN, ceramics, aluminum oxide or silicon carbide. The abrasive material could be bonded to a paper or woven fabric cloth or could be bonded or coated to the tool 200 directly. As the abrasive material is rubbed against the edge 104 (edge surfaces) of the airfoil 102, the edge 104 is contoured into an ideal shape, a near-ideal shape, or a desired shape. Instead of abrasive materials, a cutter with a desired shape and/or cutting edges (e.g., as on a file or rasp) can also be used.

In one specific example, the abrasive material is sandpaper. The grit count/number of the sandpaper could be from 150-400 grit in one example. Other grit ranges can be used depending upon the application.

The main body 202 may be constructed of plastic or some other suitable material.

In operation, the tool 200 is positioned over the edge 104 of the airfoil 102 such that the edge 104 is received in the open slot 208 and, more specifically, in the edge slot 210. The surface 206 of locator portion 204 is pressed against the surface 130 of the airfoil (not shown in FIG. 2) to orient the edge slot 210 with respect to the edge 104. The main body 202 and locator portion 204 are configured so that when the edge 104 of the airfoil 102 is disposed in the edge slot 210 and the surface 206 of the locator portion 204 is pressed against the surface 130 of the airfoil 102, the tool 200 is positioned correctly on the edge 104 of the airfoil 102. For example, the tool 200 is positioned so that it can correctly contour the edge 104 of the airfoil 102 to an ideal or near-ideal shape. If the surface 206 of the locator portion 204 were not pressed against the surface 130 of the airfoil 102 to orient the edge slot 210 of the tool 200 with respect to the edge 104 of the airfoil 102, the edge 104 of the airfoil might be contoured in an improper or skewed shape.

In operation, the tool 200 is moved manually or automatically along the leading edge 104 of the airfoil 102 (e.g., as shown in FIG. 1). As the tool 200 is moved along the edge 104 of the airfoil 102, the edge 104 of the airfoil 102 interacts with and is abraded by the abrasive material (e.g., sandpaper) on the sides 212 of the edge slot 210. As this contact and abrasion occurs, the leading edge 104 of the airfoil 102 is made to conform to the ideal shape, near ideal shape, or desired shape (e.g., as represented by the shape or dimensions of the edge slot 210 and the orientation of the edge slot 210 with respect to the edge 104 of the airfoil 102).

It will be appreciated that only portions of the leading edge 104 of the airfoil 102 may be contoured. If one end 150 of the airfoil 102 is viewed as being at the 0 percent position and the other end 152 of the airfoil 102 is viewed as being at the 100 percent position, the contouring of the edge 104 of the airfoil 102 may occur only from the 75 percent to 100 percent position in one example. As mentioned, the surface 206 of the locator portion 204 also translates (with the rest of the tool 200). As the surface 206 of the locator portion 204 follows the surface 130 of the airfoil 102, the orientation or relative position between the surface 130 of the airfoil 102 and the edge slot 210 is maintained along the length of the edge 104, ensuring that the leading edge 104 of the airfoil 102 is properly contoured.

Figure 5:
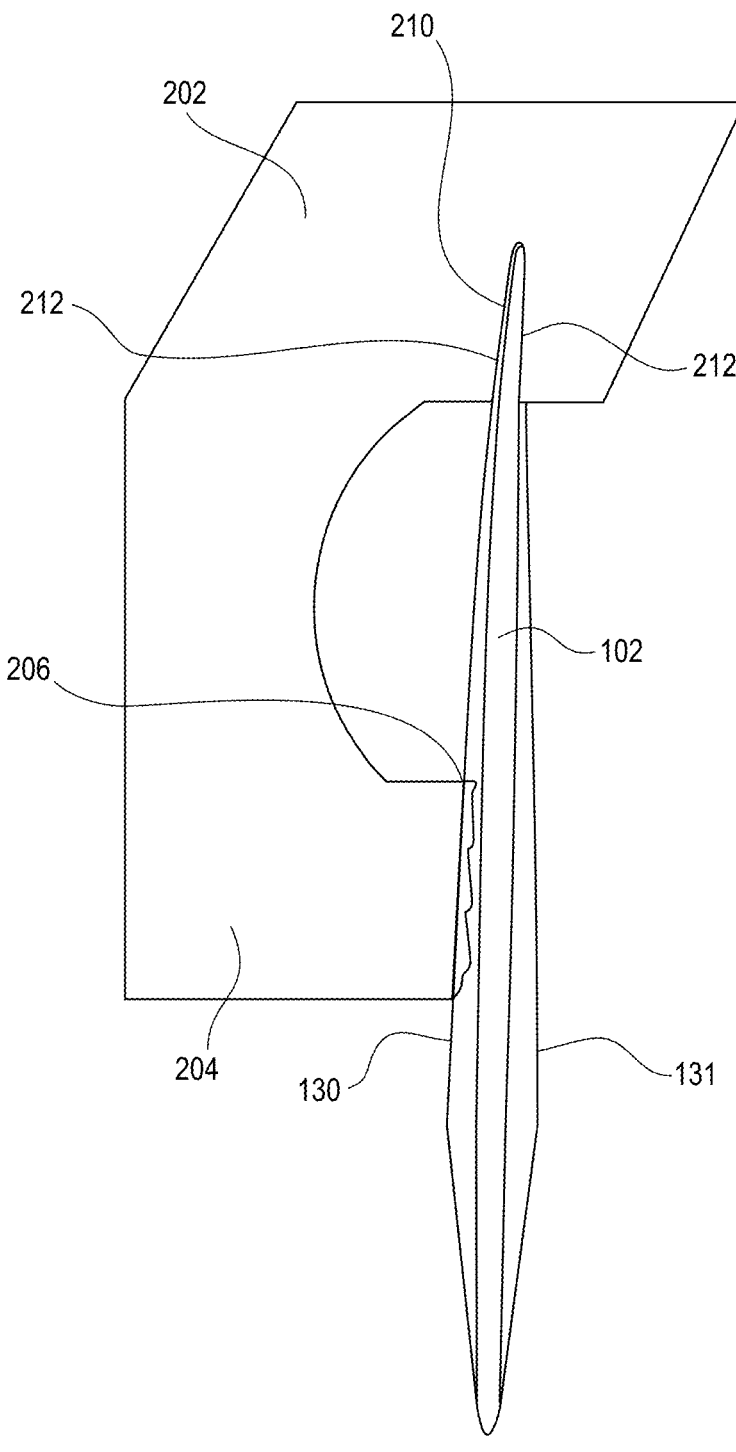
FIG. 5 comprises a diagram of a tool and airfoil as configured in accordance with various embodiments of these teachings.

Referring now to FIG. 5, an airfoil 220 is shown as being inserted into the open slot 208 and into the edge slot 210. The main body 202 is sized and configured so that when the edge 104 of the airfoil 102 is in the edge slot 210 and the surface 206 of the locator portion 204 is pressed against the surface 130 of the airfoil 102 (as shown in FIG. 5), the tool 200 can be moved along the edge 104 thereby contouring (e.g., by sanding or smoothing) the leading edge 104 of the airfoil 102150

Referring now to FIG. 3, another type of tool 300 is described that provides different operations than the tool 200 described with respect to FIG. 2. The tool 300 includes a main body 302. The main body 302 has a locator portion 304 with a surface 306. The upper portion of the main body 302 includes an open slot 308 including an edge slot 310. In some examples, sides 312 of the edge slot 310 have an abrasive material (e.g., sandpaper) applied. As abrasive material rubs against the edge 104 (edge surfaces) of the airfoil 102, the edge 104 is contoured into an ideal shape or a near-ideal shape. In some other examples, the abrasive material is removed from the sides 312.

The tool 300 also includes a raised portion 330 with a surface 332. The surface 332 is covered with an abrasive material such as sandpaper. The surface 332 is configured to contact raised portions of the edge 104, discussed in further detail below. The surface 332 engages and sands raised portions on the surface 130 of the edge 104 of the airfoil 102 (e.g., either the concave side or the convex side) as the edge 104 of the airfoil 102 is contoured by the tool 300. As mentioned and in some aspects, the sandpaper on sides 312 is removed and the tool 300 is only used to remove high spots from one side or edge of the airfoil.

The main body 302 and the raised portion 330 may be constructed of plastic or some other suitable material. In operation, the tool 300 is positioned over the edge 104 of the airfoil 102 such that the edge 104 is received in the open slot 308 and, more specifically, in the edge slot 310. The surface 306 of the locator portion 304 is pressed against the surface 130 of the airfoil 102 (not shown in FIG. 3) to orient the edge slot 210 with respect to the edge 104. The main body 302 and locator portion 304 are configured so that when the edge 104 of the airfoil 102 is disposed in the edge slot 310 and the surface 306 of the locator portion 304 is pressed against the surface 130 of the airfoil 102, the edge 104 of the airfoil 102 is positioned correctly, e.g., it is positioned so that it can be correctly contoured to an ideal or near-ideal shape. If the surface 306 of the locator portion 304 were not pressed against the surface 130 of the airfoil 102 to orient the edge slot 310 of the tool 300 with respect to the edge 104 of the airfoil 102, the edge 104 of the airfoil might be contoured in an improper or skewed shape.

In operation, the tool 300 is moved manually or automatically along the leading edge 104 of the airfoil 102 (e.g., as shown in FIG. 1). As the tool 300 is moved along the edge 104 of the airfoil 102, the edge 104 of the airfoil 102 interacts with and is abraded by the abrasive material (e.g., sandpaper) on the sides 312 of the edge slot 310. As this contact and abrasion occurs, the leading edge 104 of the airfoil 102 is made to conform to the ideal shape, near ideal shape, or desired shape (e.g., as represented by the shape or dimensions of the edge slot 310 and the orientation of the edge slot 310 with respect to the edge 104 of the airfoil 102).

Referring now to FIG. 4, another type of tool 400 is described. The tool 400 performs different operations than the tools described with respect to FIG. 2 and FIG. 3 (e.g., the tool 400 is configured to contour or impact different regions that the tools described in these other figures). The tool 400 includes a main body 402. The main body 402 has a locator portion 404 with a surface 406. The upper portion of the main body 402 includes an open slot 408 including an edge slot 410. In some examples, sides 412 of the edge slot 410 have an abrasive material (e.g., sandpaper or grit) applied and, in other examples, the abrasive material is not applied to the sides 412. If abrasive material is present on the sides 412, as the edges (edge surfaces) of the airfoil are rubbed against the abrasive material, the edges are contoured into a desired shape (e.g., an ideal shape or a near-ideal shape).

The tool 400 also includes a raised portion 430 with a surface 432. The surface 432 is covered with an abrasive material such as sandpaper. As the airfoil is contoured, the surface 432 engages and sands raised portions on one side of the airfoil (e.g., the convex side). As mentioned and in some aspects, the sandpaper on sides 412 is removed and the tool is only used to remove high spots from one side (e.g., the concave side) of the airfoil.

The main body 402 and the raised portion 430 may be constructed of plastic or some other suitable material. In operation, the tool 400 is positioned over the edge 104 of the airfoil 102 such that the edge 104 is received in the open slot 408 and, more specifically, in the edge slot 410. The surface 406 of the locator portion 404 is pressed against surface 131 of an airfoil 102 (not shown in FIG. 4) to orient the edge slot 410 with respect to the edge 104 The main body 402 and locator portion 404 are configured so that when the edge 104 of the airfoil 102 is disposed in the edge slot 410 and the surface 406 of the locator portion 404 is pressed against the surface 131 of the airfoil 102, the edge 104 of the airfoil 102 is positioned correctly, e.g., it is positioned so that it can be correctly contoured to an ideal or near-ideal shape. If the surface 406 of the locator portion 404 were not pressed against the surface 131 of the airfoil 102 to orient the edge slot 410 of the tool 400 with respect to the edge 104 of the airfoil 102, the edge 104 of the airfoil might be contoured in an improper or skewed shape.

In operation, the tool 400 is moved manually or automatically along the leading edge 104 of the airfoil 102 (e.g., as shown in FIG. 1). As the tool 400 is moved along the edge 104 of the airfoil 102, the edge 104 of the airfoil 102 interacts with and is abraded by the abrasive material (e.g., sandpaper) on the sides 412 of the edge slot 410. As this contact and abrasion occurs, the leading edge 104 of the airfoil 102 is made to conform to the ideal shape, near ideal shape, or desired shape (e.g., as represented by the shape or dimensions of the edge slot 410 and the orientation of the edge slot 410 with respect to the edge 104 of the airfoil 102).

Figure 6A:
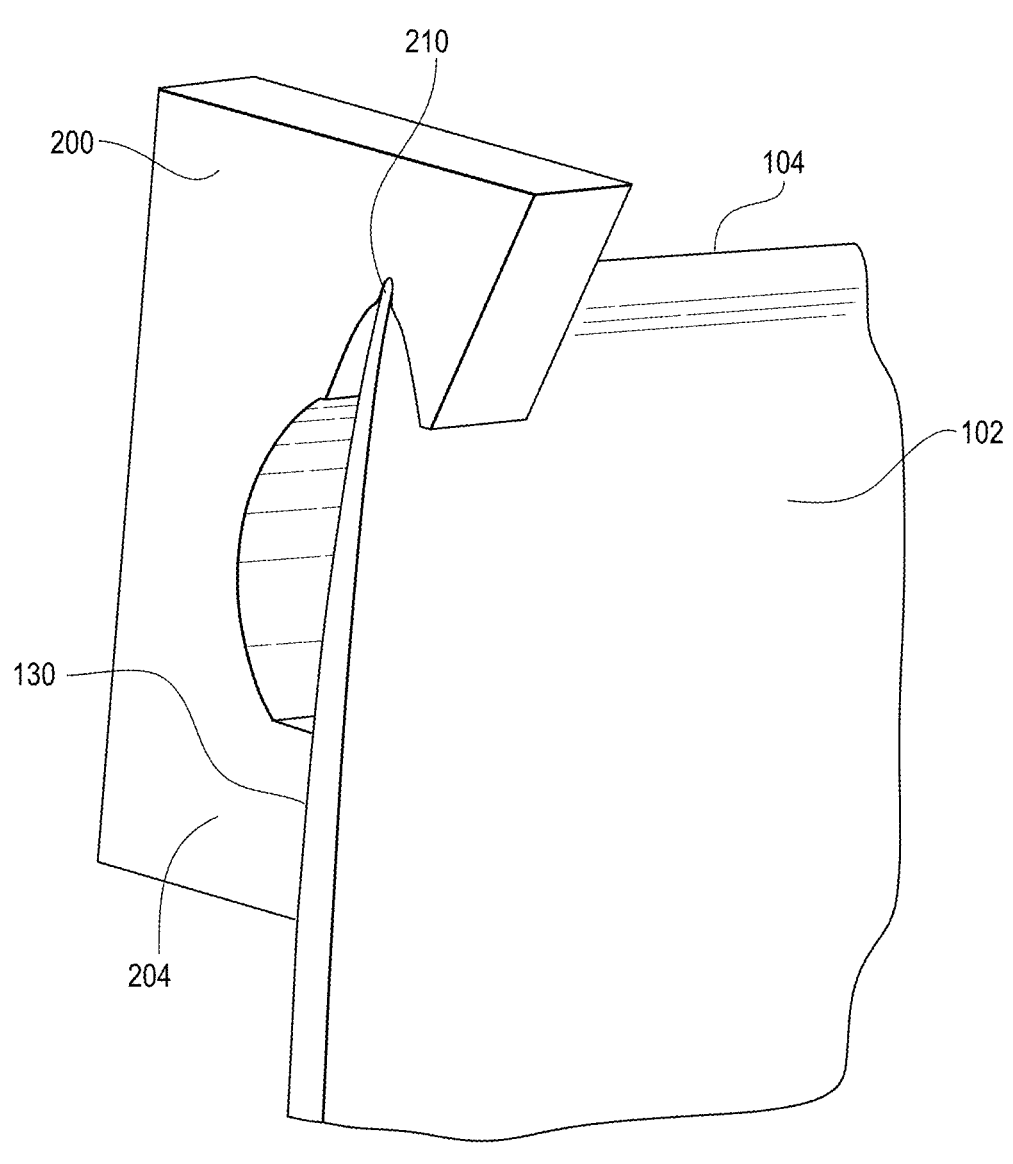
FIG. 6A comprises a diagram of a tool and airfoil as configured in accordance with various embodiments of these teachings.
Figure 6B:
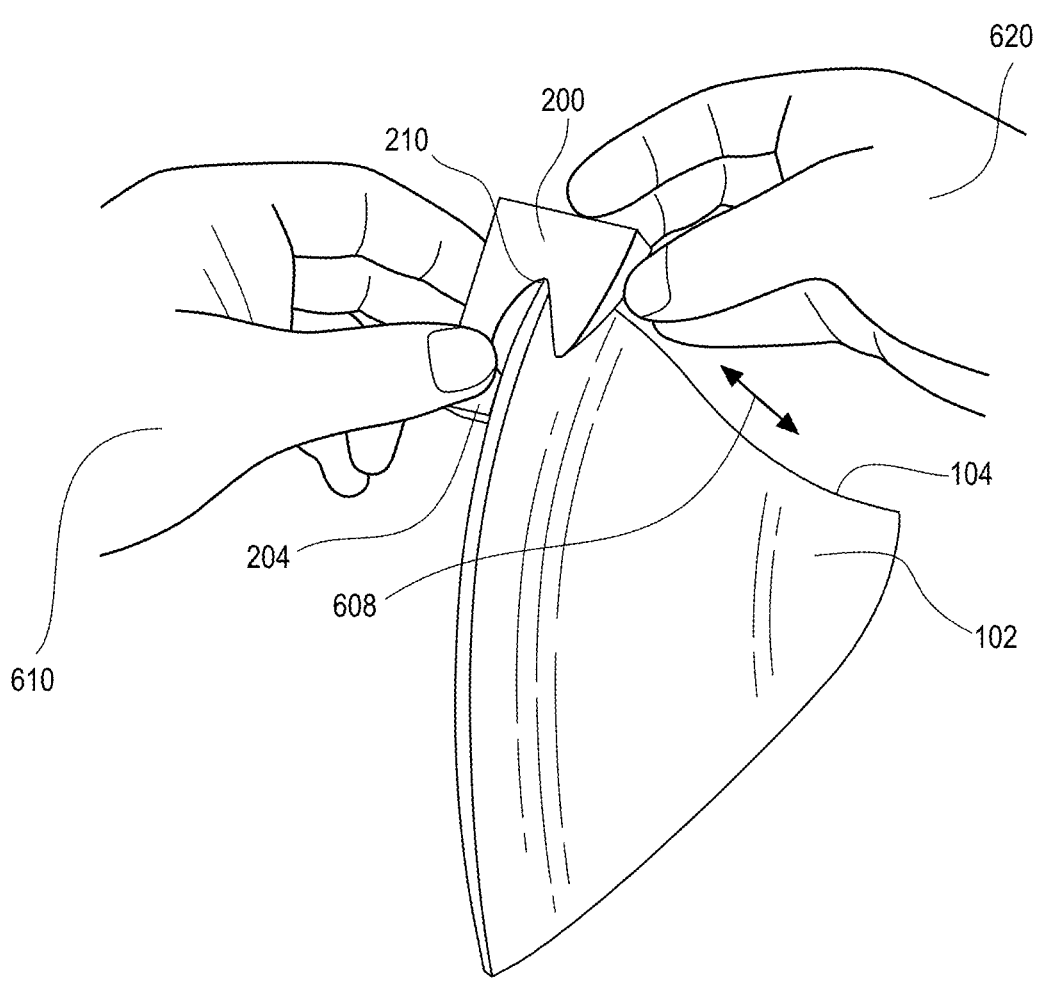
FIG. 6B comprises a diagram of a tool and airfoil as configured in accordance with various embodiments of these teachings.

Referring now to FIG. 6A and FIG. 6B, one example of a contouring tool 200 and the use of this contouring tool 600 are described. An airfoil 102 includes a leading edge 104. The leading edge 104 of the airfoil 602 is inserted into edge slot 210 of the contouring tool 200. More specifically, the leading edge 104 is inserted into the slot 210 and moved along the leading edge 104 back-and-forth along the directions of the arrows labeled 608.

A human (human hands 610) engages the tool 200 against the airfoil 102. A locator portion 204 of the contouring tool 200 is pressed against one side 130 of the airfoil 102. The human hand or fingers 610 press, hold, and/or secure the tool 200 there. At the same time, the leading edge 104 of the airfoil 102 is placed in the slot 210 of the contouring tool 200. Another human hand or fingers 620 engages the other side of the contouring tool 200. Together, and in cooperation, the human hands 610, 620 slide the contouring tool 200 back-and-forth along the leading edge 104 to contour the leading edge 104 of the airfoil 102 as the locator portion 204 is pressed against the airfoil 102. Since the locator portion 204 follows the surface 130, its relative position will remain constant ensuring that the leading edge 104 of the airfoil 102 is properly contoured. In aspects, between 80-90 percent of the total force being applied to the tool 100 is applied onto the area of the tool 200 engaging the leading edge 104 of the airfoil while 10-20 percent of the total force applied to the portion of the tool 200 is applied to the locating feature.

Figure 7:
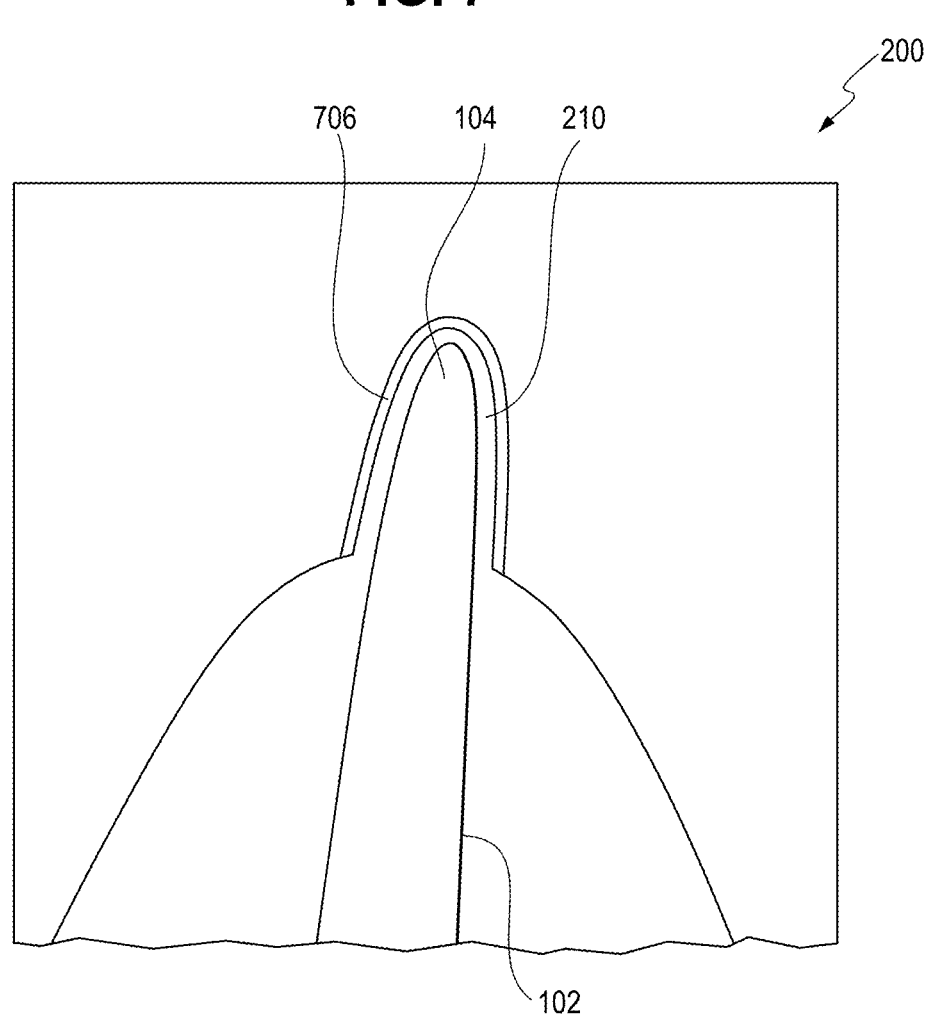
FIG. 7 comprises a diagram of an edge slot of a tool and an airfoil edge as configured in accordance with various embodiments of these teachings.

Referring now to FIG. 7, one example of the edge slot 210, in which the leading edge of an airfoil is positioned is described. An airfoil 102 has a leading edge 104 and the leading edge 104 is placed in a slot 210 of a tool 200. Abrasive material (e.g., sandpaper) 706 is adhered to the edge of the slot 210. As the tool 200 moves along the leading edge 104 (moves into and out of the page in this view), the leading edge 104 is re-contoured according to the shape of the slot 210.

Referring now to FIGS. 8A-8D, different cross-sectional sections of a leading edge 104 of an airfoil 102 in different physical states are shown and described. The airfoil 102 includes a convex side 812 and a concave side 813. Initially, the leading edge 810 is rough, worn, and/or mis-shaped and this is gradually contoured into a nominal or desired shape. Also as shown in these diagrams, the leading edge has an ideal edge shape 808, a minimum contour shape 804 (the minimum shape where contouring can be performed, and a maximum contour shape 806 (the maximum shape where contouring can be performed). In this example, the initial leading edge 810 includes two highpoints 814, 816. The highpoints 814, 816 are more prominently raised with respect to the ideal edge shape 808 whereas the remained of the initial leading edge 810 is less prominently raised with respect to the ideal edge shape 808.

FIGS. 8A-8D show the effects of the contouring processing of the edge 104 of the airfoil 102. All of these diagrams show a cross section of the edge 104 of the airfoil 102. In these examples, a first tool (e.g., tool 200) is applied to yield the shape in FIG. 8B.

Figure 8A:
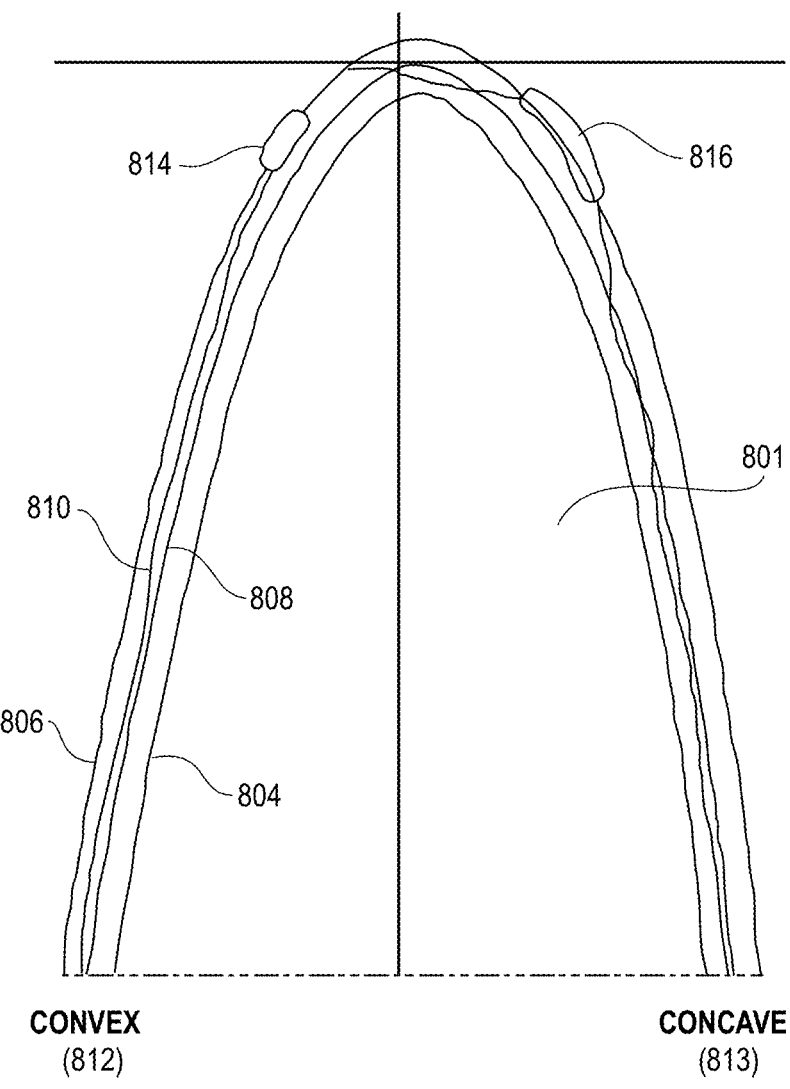
FIG. 8A comprises a diagram of an airfoil edge as configured in accordance with various embodiments of these teachings.
Figure 8B:
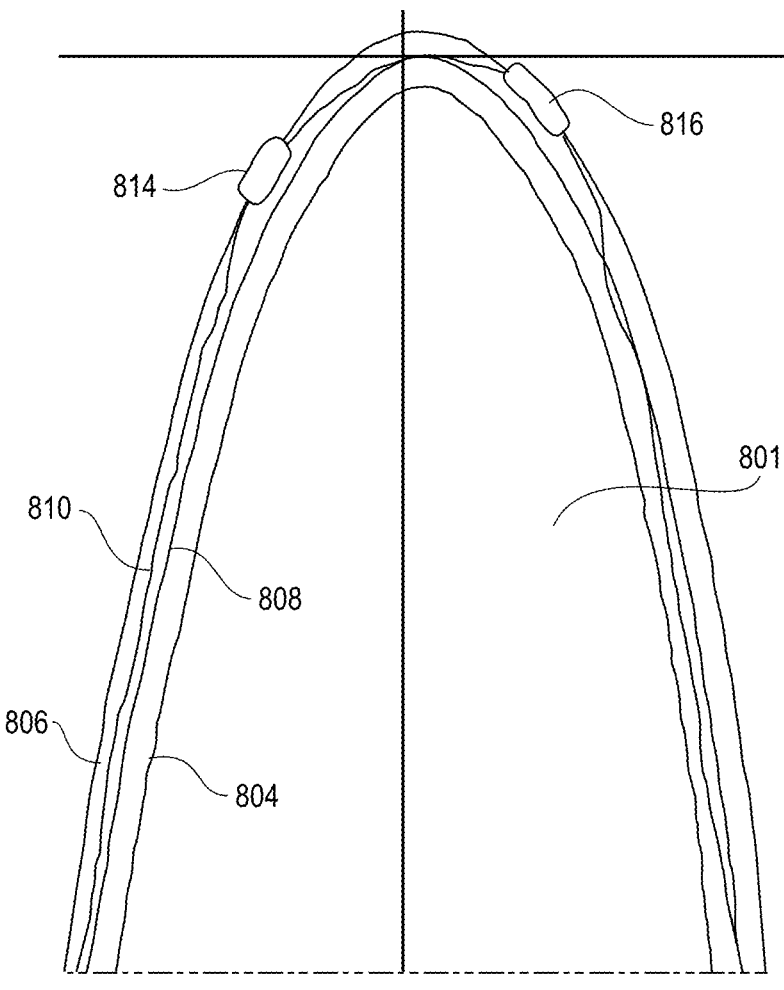
FIG. 8B comprises a diagram of an airfoil edge as configured in accordance with various embodiments of these teachings.
Figure 8C:
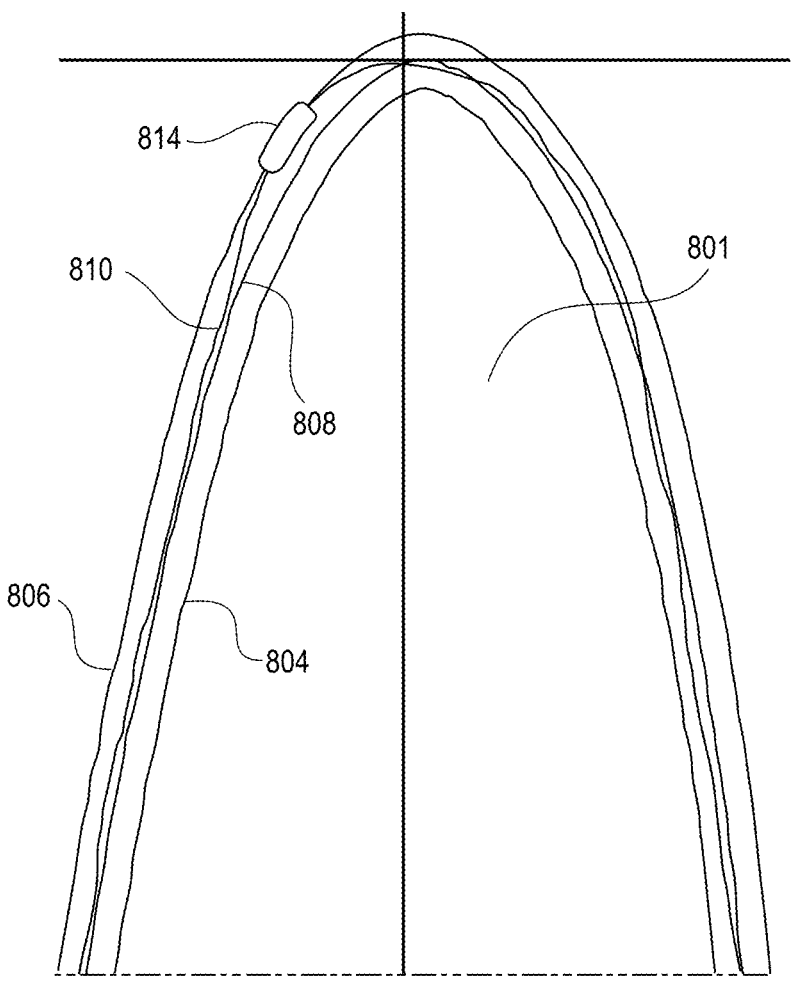
FIG. 8C comprises a diagram of an airfoil edge as configured in accordance with various embodiments of these teachings.

Then, the second tool (e.g., the tool 300) is applied to obtain the shape shown in FIG. 8C. This action removes highpoints 816 on the concave side 813.

Figure 8D:
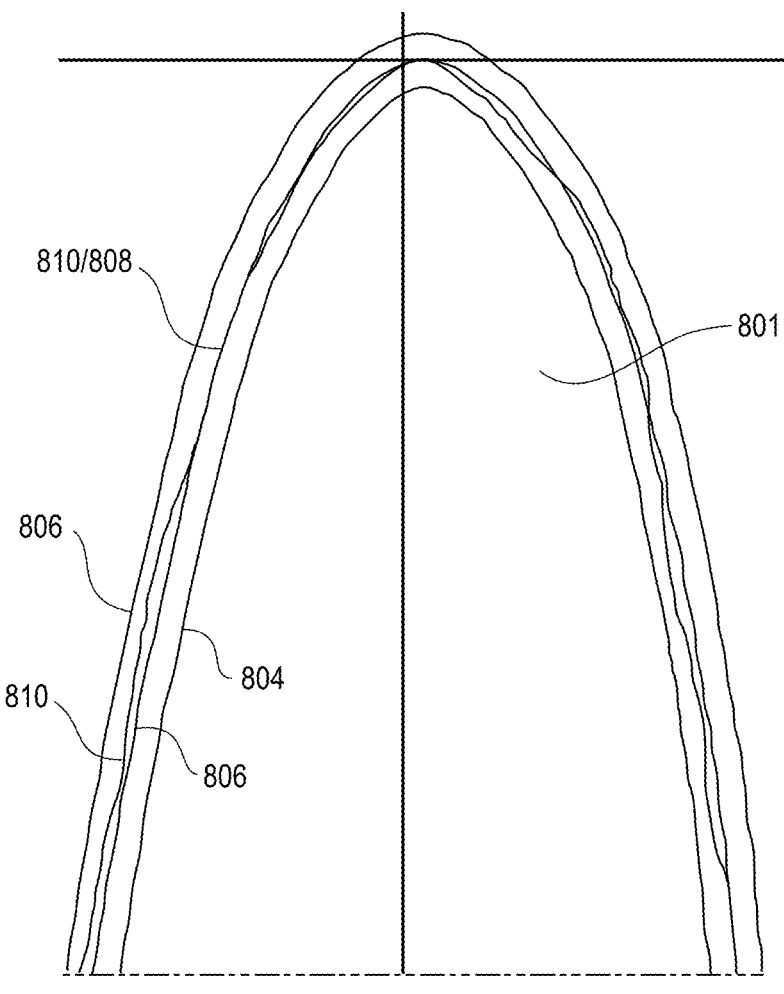
FIG. 8D comprises a diagram of an airfoil edge as configured in accordance with various embodiments of these teachings.

Finally, the third tool (e.g., the tool 400) is applied to the leading edge to obtain the shape shown in FIG. 8D. This removes highpoint 814 on the convex side 812.

It will be understood that the some or all of the tools (e.g., the tools 200, 300, 400) may be used. For example, it may be only necessary to use the tool 200 and not use the tools 300 and 400. In another example, it may be necessary to use the tools 200 and 300 and not the tool 400. In still other examples, it may be necessary to use the tools 200 and 400 but not the tool 300. In yet another example, it may be necessary to use all the tools 200, 300, and 400. The number of tools used, in aspects, depends upon the particular airfoil being serviced.

More specifically, FIG. 8A shows the airfoil 102 before any of the tools have been applied to contour the leading edge 104. As can be seen, the leading edge 810 is rough, uneven, and has two highpoints 814 and 816.

FIG. 8B shows the airfoil 102 after a first tool (e.g., tool 200) has been applied. This diagram shows the initial sanding down of the leading edge 104 has occurred but the two highpoints (raised portions) 814 and 816 of the leading edge 104 are still present.

FIG. 8C shows the airfoil 102 after the second tool (e.g., tool 300) that sands down the concave side of the airfoil 102 is applied. This diagram shows the highpoints 816 has been sanded down or contoured by a tool 300. In aspects, surface 332 of the tool 300 is applied against the highpoints 816 to reduce or remove these highpoints 816.

FIG. 8D shows the airfoil 102 after the third tool (e.g., tool 400) that sands down the convex side of the airfoil 801 is applied. This diagram shows the highpoints 814 has been sanded down or contoured by a tool. In aspects, surface 432 of the tool 400 is applied against the highpoints 816 to reduce or remove these highpoints 814.

Figure 9:
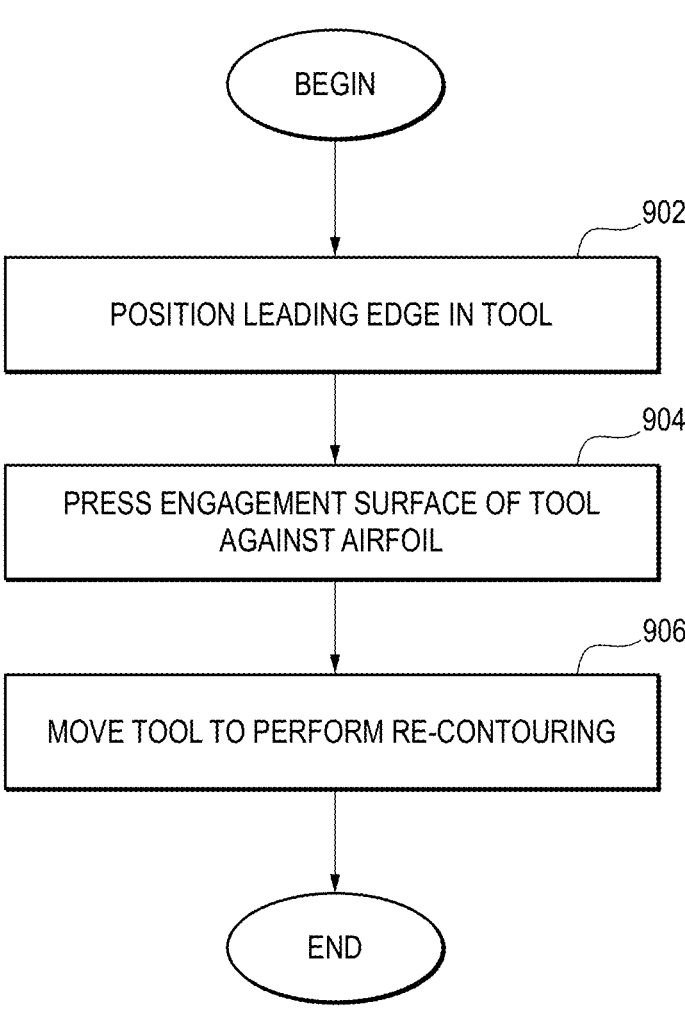
FIG. 9 comprises a flowchart as configured in accordance with various embodiments of these teachings.

Referring now to FIG. 9, one example of a method for contouring the leading edge 104 of an airfoil 102 is described.

At step 902, the leading edge 104 of an airfoil 102 is positioned in an edge slot 210 of a tool 200. The tool comprises a main body that defines a locator portion 204 and an upper portion. The locator portion 204 includes an engagement surface 206. Positioning may be performed manually, but in some cases automatic positioning (e.g., by machines such as robots) can be used.

At step 904, the engagement surface 206 of the tool 200 is pressed to engage a surface of the airfoil 102. As indicated elsewhere herein, the engagement surface 206 is located with the locator portion 204 of the tool 200. A user, for example, using their hands and fingers, manually positions the tool 200 and presses the tool 200 so that the engagement surface 206 presses against the surface 130 of the airfoil 102. Depending upon the tool being used, the surface of the airfoil 120 may either be the surface on the convex side of the airfoil 102 or the concave side of the airfoil 102. As mentioned, this step may be performed manually, but in some cases automatic positioning (e.g., by machines such as robots) can be used.

At step 906, when the edge 104 of the airfoil 102 is disposed in the edge slot 210 and with the surface of the locator portion 204 simultaneously pressed against the surface 130 of the airfoil 102, the tool 200 is moved back-and-forth along the leading edge 104 of the airfoil 102 so that engagement of the tool 200 with the edge 104 of the airfoil 102 is effective to contour the edge 104 of the airfoil 102 to a preselected and desired shape. As described elsewhere herein, one or more slots in the tool 200 are configured, sized, and/or shaped according to a desired shape for the leading edge of the airfoil. As the back-and-forth action occurs, abrasive material on the tool rubs, smooths, sands or otherwise impacts the leading edge to conform the leading edge to the desired shape. This step may be performed manually, but in some cases automatic positioning (e.g., by machines such as robots) can be used.

Figure 10A:
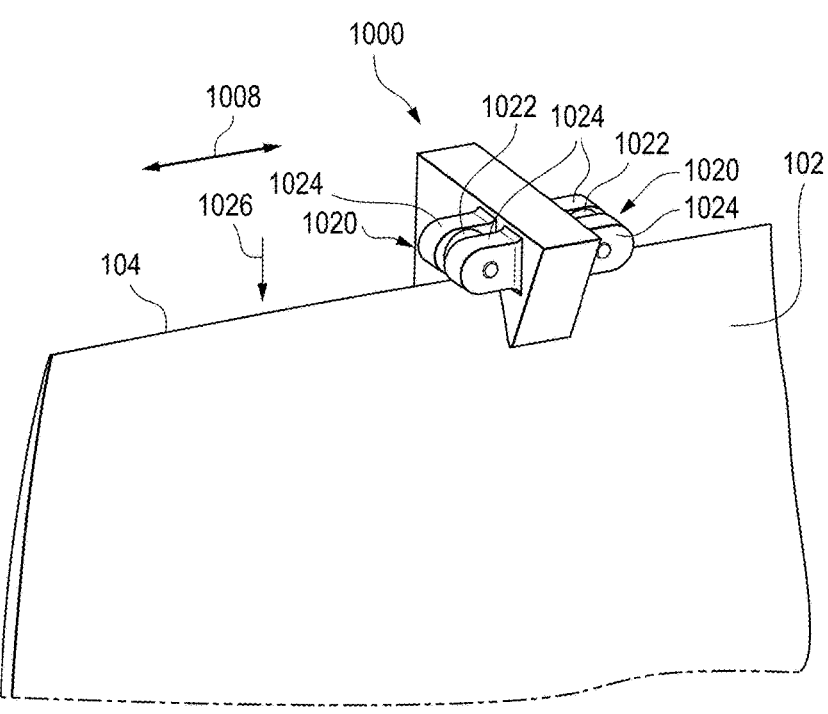
FIG. 10A comprises a diagram of a tool and airfoil as configured in accordance with various embodiments of these teachings.
Figure 10B:
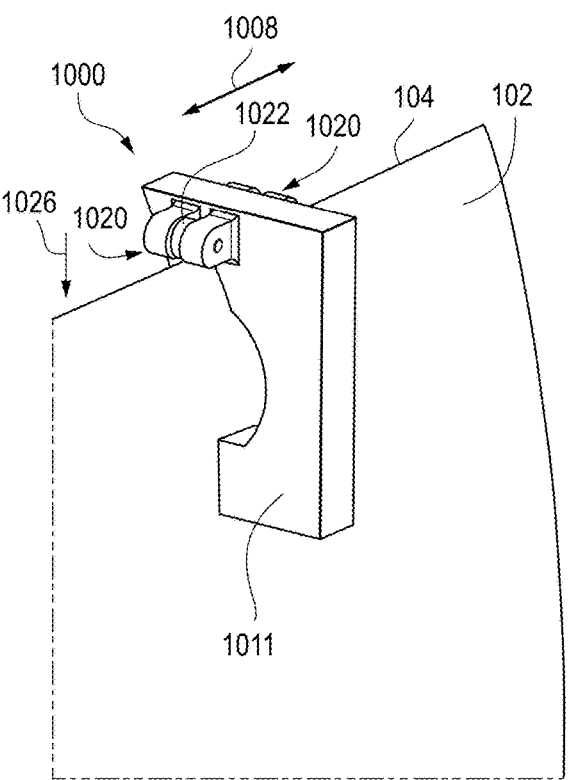
FIG. 10B comprises a diagram of a tool and airfoil as configured in accordance with various embodiments of these teachings.
Figure 10C:
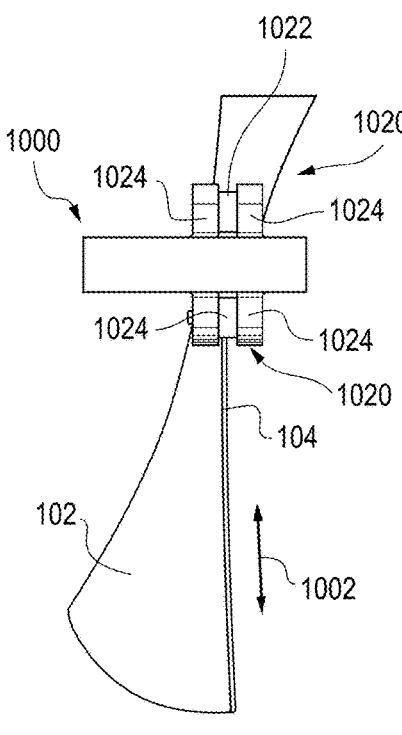
FIG. 10C comprises a diagram of a tool and airfoil as configured in accordance with various embodiments of these teachings.

Referring now to FIG. 10A, FIG. 10B, and FIG. 10C, one example of a contouring tool 1000 with a stopper 1020 is described. The stopper 1020 is attached to the tool and prevents the tool from further contouring the edge of the airfoil once the stopper 1020 impacts the airfoil.

More specifically, an airfoil 102 includes a leading edge 104. The leading edge 104 of the airfoil 102 is inserted manually or automatically into a slot of the contouring tool 1000 (examples of which include the tools 200, 300, and 400). The leading edge 104 of the airfoil 102 is inserted manually or automatically into the slot and moved along the leading edge 104 back-and-forth along the directions of the arrows labeled 1008. A human (or potentially a machine) engages the tool against the airfoil 102. A locator portion 1011 of the contouring tool 1000 (e.g., surfaces 206, 306, and 406 of tools 200, 300, and 400) is pressed against one side of the airfoil 102 either manually or automatically.

The stopper 1020 is coupled to the contouring tool 1000 to restrict further material removal from the edge of the airfoil 102 once the stopper 1020 comes into contact with the leading edge 104 of the airfoil 102 to prevent too much material being removed from the airfoil 102. The stopper 1020 is deployed at any location so that they impact the airfoil 102 once sufficient material has been removed from the edge 104 of the airfoil 102. In the present case, the stopper 1020 comprises a roller 1022 held by supports 1024. However, other examples of stoppers (e.g., pads) can also be used. One or more of the roller 1022 and supports 1024 come into contact with the leading edge 104 to prevent too much material from being removed.

In aspects, the contouring tool 1000 is configured to remove the high points on the airfoil 102. Initially, a gap exists between the blunted edge of the leading edge 104 of the airfoil 102 and the contouring tool 1000. As these high points are removed, the gap reduces in size as the tool 1000 would move relative to the blade cross section, in this example, in the general direction (downward) of the arrow labeled 1026. In other words, as the contouring tool 1000 is moved back-and-forth in the direction indicated by the arrow labeled 1008, it also moves slightly downward in the direction indicated by the arrow labeled 1026. The stopper 1020 eventually comes into contact with the airfoil 1002 as the airfoil 1002 is contoured, serving to prevent further material removal because the stopper 1020 is not abrasive. Once contact is made, the movement of the contouring tool 1000 in the direction indicated by the arrow labeled 1008 is manually or automatically halted. In other aspects, the stopper 1020 may orient the tool 1000 so that the tool 1000 will not swivel.

Figure 11:
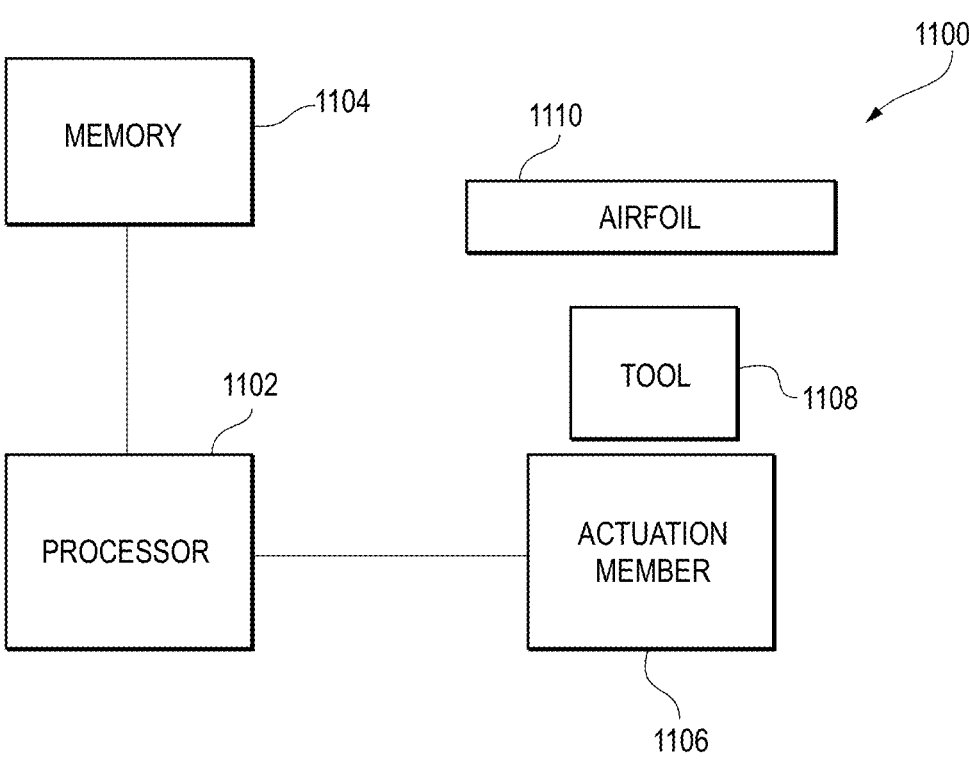
FIG. 11 comprises a diagram of an automated system for contouring edges of airfoils in accordance with various embodiments of these teachings.

Referring now to FIG. 11, one example of an automated system 1100 for contouring the edge 104 of the airfoil 102 is described. The automated system 1100 includes a processor 1102, a memory 1104, actuation members 1106, a tool (or tools) 200, 300, or 400) and an airfoil 1110. A user interface (not shown) may be coupled to the processor 1102 to allow a human user to interact with the system and/or receive information (e.g., system feedback, messages, images, or other information or data). The above-mentioned elements may be located in the same area (e.g., same room), but in other examples may be dispersed across different and remote locations (e.g., the processor 1102 may be disposed at a central location while the actuation members 1106, tool 200, 300, or 400, and airfoil 1110 may be disposed at a remote location).

The processor 1102 is any processing devices such as a controller or microprocessor. The memory 1104 is any type of electronic memory device such as a random access memory (RAM), read only memory (ROM), or electronically erasable programmable read-only memory EEPROM to mention a few examples. The memory 1104 stores executable computer instructions that control actuation members 1106.

The actuation members 1106 may be assembled as a robot, multiple robots, or multiple other machines. The actuation members 1106 may include arms, pincers, and/or grippers arranged in any configuration that allow for the usage of the tool 200, 300, or 400 and application of the tool 1108 to the edge of the airfoil 102.

The tools 200, 300, or 400 is any combination of the tools described herein (e.g., the tools 200, 300, and/or 400 as described above). The airfoil 102 is an airfoil blade as has been described herein.

In operation, the actuation members 1106 are coupled or attached to the tool 200, 300, or 400. For example, if the actuation members 1106 include a robotic arm, the tool 1108 is attached (using any suitable attachment procedure or structure) to the end of the robotic arm. In these regards, both the actuation members 1106 and the tool 200, 300, or 400 have structures that support attachment. For example, the tool 200, 300, or 400 may be structured so that a specific area of the tool 200, 300, or 400 may be gripped by the actuation members 1106.

The attachment procedure may be automatic (e.g., controlled by the processor 1102) or manual (e.g., accomplished by a human). Once the tool 200, 300, or 400 is attached, the processor 1102 sends control signals to move the robotic arm to a position around the airfoil 102, locate the edge 104 of the airfoil 102 (e.g., using a camera to take images of the airfoil/edges of airfoil 102 and process the image to find the edge for instance using machine learning or artificial intelligence approaches), moving the tool 200, 300, or 400 to fit the slot of the tool 200, 300, or 400 onto the edge 104 of the airfoil 102, and then moving the tool 200, 300, or 400 across the edge of the airfoil 102 as described elsewhere herein.

Periodically, the tool 200, 300, or 400 may be removed from the airfoil 102 so that further images obtained of the edge of the airfoil 102. These further images may be evaluated to see if further contouring is required or whether contouring may be halted. When a stopper is used with the tool 200, 300, or 400 (as shown in FIG. 10), then sensors may detect when the stopper contacts the airfoil so that the contouring operation may be halted.

When multiple tools are used, the tools may be attached to and detached from the actuation members 1106 as required. For example, a first tool (e.g., the tool 200) may be used. After the contouring by the first tool is accomplished, the first tool may be detached from the actuation members 1106 and the second tool (e.g., the tool 300) may be used. After the contouring by the second tool is accomplished, the second tool is detached from the actuation members 1106 and the third tool (e.g., the tool 400) is attached to the actuation members 1106. Contouring of the edge is then performed using the third tool.

As mentioned, automatic operation of the automated system 1100 may utilize the processor 1102 and the processor 1102 may utilize artificial intelligence or machine learning approaches during operations. For example, a neural network may be used that is configured to recognize the leading edges of airfoils (so as to correctly position the tool 200, 300, or 400 using the actuation members 1106). These approaches can also be used to recognize when the airfoil 102 has been sufficiently contoured to a predefined shape. In other examples, the neural network may determine when specific tools need to be used (e.g., to determine which ones of the tools 200, 300, and/or 400 should be utilized). If a neural network is used, the neural network may be trained with training images and/or other data so that the above-mentioned determinations can be made. The training process alters the layers, weights, or other structures of the neural network.

Figure 12:
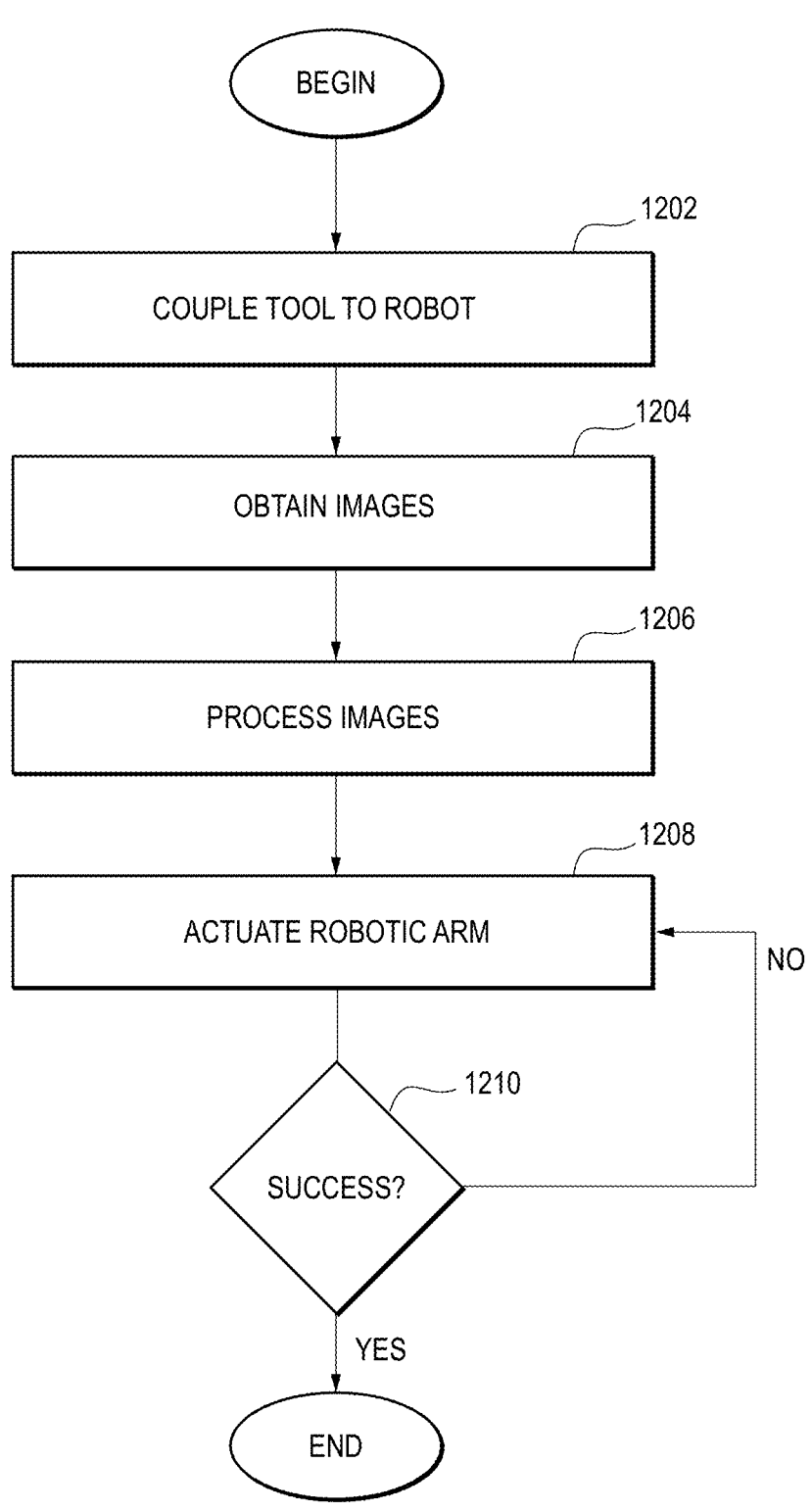
FIG. 12 comprises a flowchart of an approach for using the automated system of FIG. 11 for contouring edges of airfoils in accordance with various embodiments of these teachings.

Referring now to FIG. 12, one example of the operation of the system of FIG. 11 is described. At step 1202, the processor 1102 couples or attaches to the tool 200, 300, or 400 to a robotic arm (where the robotic arm is an example of actuation members 1106). For example, if the robotic arm includes a gripper the processor sends control signals to the robotic arm that are effective to cause the gripper to open around the tool 200, 300, or 400 and then close to secure the tool 200, 300, or 400 in the gripper. Alternatively, a human may attach the tool 200, 300, or 400 to the robotic arm.

At step 1204, one or more cameras obtain images of the tool and/or airfoil 102 including the edge of the airfoil 102 and the placement of the airfoil 102 relative to the tool 200, 300, or 400 on the robotic arm. At step 1206, these images are processed by the processor 1102 to obtain information such as locations of edge of the airfoil 102, distances from the tool 200, 300, or 400 to the edge of the airfoil 102, and a pathway from the current location of the tool 200, 300, or 400 to the edge of the airfoil 102. The information determined may be expressed as coordinates in a global coordinate system.

At step 1208, using the information obtained at step 1206, the processor 1102 sends control signals to move the robotic arm to a position the tool 200, 300, or 400 around the airfoil 102, and then locate the edge of the airfoil 102 and move the tool 200, 300, or 400 such that the slot of the tool 200, 300, or 400 fits into the edge of the airfoil 102.

At step 1208, the processor 1102 sends control signals to the robotic arm causing the robotic arm (in the gripper) to move the tool 200, 300, or 400 across the edge of the airfoil 102 as described elsewhere herein. Step 1208 results in contouring or machining of the edge of the airfoil 102 by the tool 200, 300, or 400. In aspects, step 1208 may be performed for a predetermined amount of time.

At step 1210, the processor 1102 determines whether the tool 200, 300, or 400 has contoured or machined the edge of the airfoil 102 to a required shape. To do so, the tool 200, 300, or 400 may be removed from the edge of airfoil 102 so that further images of the edge of the airfoil 102 can be obtained. These further images may be evaluated by the processor 1102 to see if further contouring is required or whether contouring may be halted. In some aspects, machine learning approaches can be used to determine whether the images of the edge of the airfoil have been machined to an acceptable shape.

When a stopper is used with the tool 200, 300, or 400 (as shown in FIG. 10A, FIG. 10B, and FIG. 10C), then sensors may detect when the stopper contacts the airfoil so that the contouring operation may be halted by the processor 1102. If the answer at step 1210 is affirmative (required shape has been achieved), then execution ends. If the answer at step 1210 is negative (the required shape has not been reached), then execution returns to step 1208 as described above.

The approach described with respect to FIG. 12 is applicable when using multiple tools. When multiple tools are used, the tools may be automatically switched on and off the robotic arm as required. For example, a first tool (e.g., the tool 200) may be used first. After the contouring of the first tool is accomplished using the process of FIG. 12, the first tool may be detached from the robotic arm and the second tool (e.g., the tool 200) used. After the contouring if the second tool is accomplished, the second tool is detached from the robotic arm and the third tool (e.g., the tool 300) is attached to the robotic arm. Contouring of the edge is then performed using the third tool. Further images of the airfoil 1110 may be obtained and the processor 1102 can make a determination as to whether it is needed to use particular tools.

Advantageously, the tools and approaches for using these tools described herein provide various advantages. The tools provided are small and way to use. Each tool can be customized to a particular desired leading-edge shape. Since the tools are small, they can be used on airfoils while the airfoil is still attached to the engine. In other words, engines do not have to be disassembled to use these approaches. For these reasons, the approaches provided herein are cost effective and easy to use and implement.

Further aspects of the present disclosure are provided by the subject matter of the following clauses:

A tool for contouring an edge of an airfoil, the tool comprising: a main body, comprising: an edge slot, wherein the edge slot is configured to be positioned on an edge of an airfoil; and an engagement surface configured to engage at least one surface of the airfoil when the edge slot receives the edge of the airfoil to orient the edge slot with respect to the edge of the airfoil.

The tool of any of the preceding clauses, wherein the edge slot includes an abrasive material.

The tool of any of the preceding clauses, wherein the abrasive material is selected from the group consisting of: sandpaper, a natural abrasive, and a synthetic abrasive.

The tool of any of the preceding clauses, wherein the abrasive material is bonded to a paper or woven fabric cloth.

The tool of any of the preceding clauses, wherein the engagement surface is configured to engage a convex side of the airfoil.

The tool of any of the preceding clauses, wherein the engagement surface is configured to engage a concave side of the airfoil.

The tool of any of the preceding clauses, further comprising a stopper, the stopper being configured to eventually contact the edge as the tool is used.

The tool of any of the preceding clauses, further comprising a roller.

The tool of any of the preceding clauses, wherein the edge slot has a shape of an edge of an airfoil.

The tool of any of the preceding clauses, wherein the engagement surface is configured to follow a surface of the airfoil as the edge slot moves along the edge of the airfoil.

The tool of any of the preceding clauses, further comprising a broader slot to guide the edge slot onto the edge of an airfoil.

The tool of any of the preceding clauses, wherein the tool is one of a set of tools.

The tool of any of the preceding clauses, wherein a robot or actuation member is coupled to and guides the tool.

A method of contouring an edge of an airfoil, the method comprising: positioning an edge of an airfoil in an edge slot of a tool; engaging an engagement surface with at least one surface of the airfoil when the edge slot receives the edge of the airfoil to orient the edge slot with respect to the edge of the airfoil.

The method of any of the preceding clauses, wherein the edge slot includes an abrasive material and the edge is contoured as the edge engages the abrasive material.

The method of any of the preceding clauses, wherein the abrasive material is selected from the group consisting of: sandpaper, a natural abrasive, and a synthetic abrasive.

The method of any of the preceding clauses, wherein the abrasive material is bonded to a paper or woven fabric cloth.

The method of any of the preceding clauses, wherein contouring of the tool is halted by a stopper that is coupled to the tool.

The method of any of the preceding clauses, wherein a robot or actuation member is coupled to and guides the tool.

The method of any of the preceding clauses, wherein the tool is manually engaged to the airfoil.

Those skilled in the art will recognize that a wide variety of modifications, alterations, and combinations can be made with respect to the above-described embodiments without departing from the scope of the invention, and that such modifications, alterations, and combinations are to be viewed as being within the ambit of the inventive concept.

The invention claimed is:

1. A tool for contouring an edge of an airfoil, the tool comprising:
   a main body, comprising:
      an edge slot, wherein the edge slot is configured to be positioned on an edge of an airfoil; and
      an engagement surface configured to engage at least one surface of the airfoil when the edge slot receives the edge of the airfoil to orient the edge slot with respect to the edge of the airfoil;
      wherein the tool is one of a set of tools;
      where the set of tools comprises a first tool, a second tool, and a third tool, wherein the first tool is configured to remove erosion from the edge of the airfoil and the second tool is configured to remove high points from the airfoil.

2. The tool of claim 1, wherein the edge slot includes an abrasive material.

3. The tool of claim 2, wherein the abrasive material is selected from the group consisting of: sandpaper, a natural abrasive, and a synthetic abrasive.

4. The tool of claim 3, wherein the sandpaper has a grit count/number of between 150-400 grit.

5. The tool of claim 2, wherein the abrasive material is bonded to a paper or woven fabric cloth.

6. The tool of claim 1 wherein the engagement surface is configured to engage a convex side of the airfoil.

7. The tool of claim 1, wherein the engagement surface is configured to engage a concave side of the airfoil.

8. The tool of claim 1, further comprising a stopper that is coupled to or formed with the main body, the stopper being configured to eventually contact the edge as the tool is used.

9. The tool of claim 8, wherein the stopper comprises a roller.

10. The tool of claim 1, wherein the edge slot has a shape of an edge of an airfoil.

11. The tool of claim 1, wherein the engagement surface is configured to follow a surface of the airfoil as the edge slot moves along the edge of the airfoil.

12. The tool of claim 1, further comprising a broader slot to guide the edge slot onto the edge of an airfoil.

13. The tool of claim 1, wherein a robot or actuation member is coupled to and guides the tool.

14. The tool of claim 1, wherein the tool is configured to be used at an engine while the engine is being installed in an aircraft.

15. The tool of claim 1, wherein the tool is configured to be used at an engine after the engine is already attached to an aircraft.

16. A set of tools for contouring an edge of an airfoil, the set of tools comprising:
   a first tool, the first tool having a main body, the main body comprising:
      an edge slot, wherein the edge slot is configured to be positioned on an edge of an airfoil; and
      an engagement surface configured to engage at least one surface of the airfoil when the edge slot receives the edge of the airfoil to orient the edge slot with respect to the edge of the airfoil;
      wherein the first tool is configured to remove erosion from the edge of the airfoil, a second tool configured to remove high points from the airfoil.

* * * * *